United States Patent [19]
Fuqua

[11] 3,842,709
[45] Oct. 22, 1974

[54] PUSH-IN FASTENER

[75] Inventor: Lloyd T. Fuqua, Fortville, Ind.

[73] Assignee: General Motors Corporation, Detroit, Mich.

[22] Filed: Aug. 20, 1973

[21] Appl. No.: 389,721

[52] U.S. Cl. .................... 85/5 R, 24/73 SB, 85/80, 248/27
[51] Int. Cl. ........................................... F16b 13/08
[58] Field of Search .......... 85/5 R, 80, 81, 3 S, 3 R; 24/73 SB; 248/27; 292/19, 353; 339/91 R

[56] References Cited
UNITED STATES PATENTS

| | | | |
|---|---|---|---|
| 1,483,218 | 2/1924 | Fahnestock | 248/27 |
| 2,081,447 | 5/1937 | Carmichael et al. | 85/5 R |
| 2,093,038 | 9/1937 | Douglas | 85/5 R |
| 2,595,994 | 5/1952 | Thomas | 248/27 |
| 2,696,138 | 12/1954 | Olschwang | 85/3 S |
| 3,241,420 | 3/1966 | Passer | 85/3 R |
| 3,366,405 | 1/1968 | Sevrence | 85/80 |
| 3,504,875 | 4/1970 | Johnson et al. | 248/27 |
| 3,769,774 | 11/1973 | Barnes | 248/58 |

FOREIGN PATENTS OR APPLICATIONS

| 120,589 | 11/1945 | Australia | 85/3 R |
|---|---|---|---|

Primary Examiner—Marion Parsons, Jr.
Attorney, Agent, or Firm—A. N. Krein

[57] ABSTRACT

A push-in fastener assembly adapted to be inserted into an aperture in a support panel, the fastener having a stud section with a first portion of a diameter to enter the aperture in the support panel and a reduced diameter portion with a radial flange at its free end, an expander with fingers outwardly flexible encircles the reduced diameter portion with a compression spring being positioned between the expander and the radial flange to normally bias the expander toward the first portion of the stud, a flanged ring encircling the expander to releasably retain the fingers thereof radially inward. When the push-in fastener is inserted into the aperture in the support panel, the flanged ring engages the front side of the support panel and becomes disengaged from the expander as the fastener is moved axially to thus allow the fingers of the expander to extend outward to engage the back side of the support panel with the spring exerting a retention force against the expander.

5 Claims, 7 Drawing Figures

PATENTED OCT 22 1974　　　　　　　　　　3,842,709

PUSH-IN FASTENER

This invention relates to fasteners and, in particular, to a blind-type push-in fastener.

In the manufacture of products from sheet metal panels, it is often necessary to attach adjacent panels to each other or to attach other elements to a support panel, such as a bulkhead panel, by the use of suitable fasteners. Conventionally, this is done by threaded fasteners, such as bolts and nuts, where access is available to both sides of the support panel so that the screw can be inserted from one side of the panel while the nut is attached from the opposite side of the panel. However, there are occasions where one side or back side of the support panel is not readily accessible and, in these situations, it is necessary to use a blind-type fastener which can be inserted from one side of the support panel to be secured thereto to support or retain another panel or element to the support panel.

Accordingly, it is the primary object of this invention to provide a push-in quick operating fastener that is self-retaining when inserted into an apertured panel, requiring no special tools or additional parts to effect assembly thereof.

Another object of this invention is to provide a blind-type fastener capable of being inserted into the aperture of a support panel whereby engagement of a portion of the fastener with the panel releases spring biased expander fingers to effect a constant tightening pressure holding the fastener and the element retained thereby against the support panel.

These and other objects of the invention are attained by means of a push-in type fastener comprising a fastener body having a first stud portion of a diameter to enter an aperture in a support panel and a reduced diameter stud portion with a radial flange at its free end. An expander with at least two flexible fingers normally extending radially outward thereon and a compression spring encircle the reduced stud portion and a flanged ring encircles the fingers of the expander to releasably hold these fingers in a radial inward direction. When the push-in fastener is inserted into the aperture in a support panel, the flanged ring engages the front side of the panel and becomes disengaged from the fingers of the expander to allow these fingers to expand radially outward to engage the back side of the support panel, the spring then exerting an axial force on the expander to provide a constant tightening pressure of the fingers against the back side of the support panel.

For a better understanding of the invention, as well as other objects and further features thereof, reference is had to the following detailed description of the invention to be read in connection with the accompanying drawings, wherein.

Figure 7:
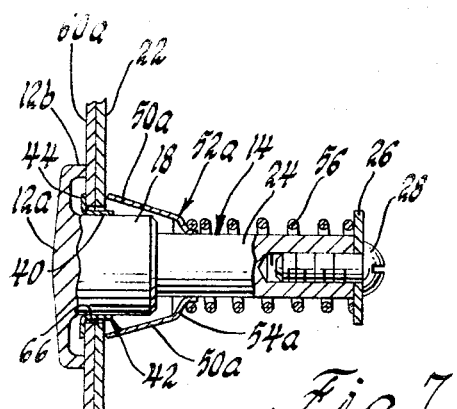
FIG. 7 is a view, similar to FIG. 5, of still another embodiment of the subject push-in fastener used as a panel fastener.

In the embodiment of the fastener illustrated in FIGS. 1 through 4, inclusive, the fastener includes a fastener body with an enlarged head 12 portion and a stud 14 portion which may be a separate element, as will become apparent in the description of the embodiment of the fastener illustrated in FIG. 7, or part of a general assembly housing or body 16, with the stud 14 cast or turned as part of the assembly housing or body, the head also being an integral part of the assembly housing or body 16 in this embodiment. It is to be realized that the assembly housing or body 16 may have one or more of such studs formed thereon, only one being shown in these drawings.

The stud 14 includes a first stud body portion 18 of a diameter adapted to be loosely inserted into the aperture 20 of a bulkhead or support panel, hereinafter referred to as panel 22, and a free end or second portion 24 of reduced diameter terminating at a radial shoulder or flange 26 which may be in the form of a flat washer suitably secured thereon such as by a screw 28 engaged in a suitable threaded aperture 30 in the free end of the stud, a shoulder 32 being provided between the first portion 18 and the second portion 24 of the stud 14.

Slidably encircling the first portion 18 of the stud 14 is the hub portion 40 of a flanged retainer ring 42, the outer diameter of this hub portion being such as to be slidably received in the aperture 20 of panel 22, while the radial flange 44 of the ring 42 extends radially outward a suitable distance so as to be in interference relationship with the panel 22 when the fastener is inserted therein to prevent passage of the entire ring 42 through the aperture 20 in the panel 22.

Figure 1:
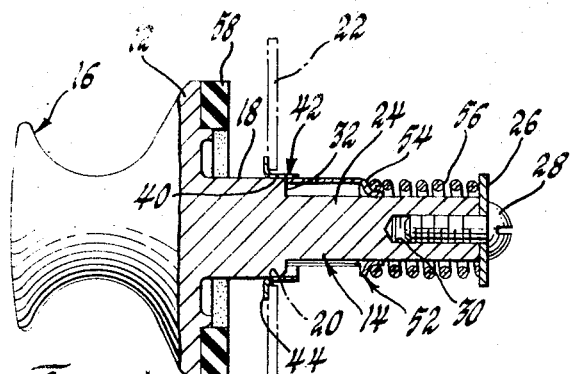
FIG. 1 is a view, partly in section, of the fastener of the invention formed as part of an assembly housing or body with the elements of the fastener shown in their as assembled condition and being inserted into an apertured support panel.
Figure 2:
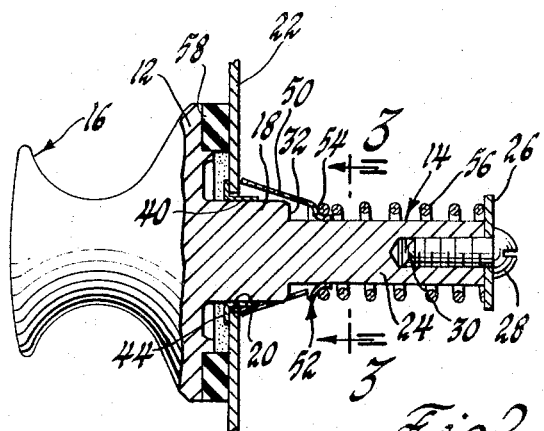
FIG. 2 is a view similar to FIG. 1 but with the elements of the fastener shown in their operative relationship engaging the support panel.
Figure 3:
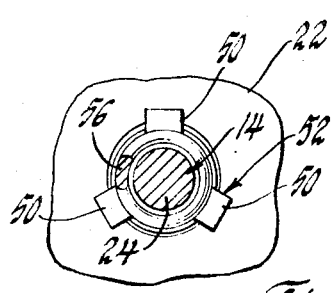
FIG. 3 is a sectional view taken along line 3—3 of FIG. 2 showing the flexible fingers of the expander of the subject fastener in their extended position.

The flanged retainer ring 42 is used, in the assembled condition of the fastener, as seen in FIG. 1, to releasably secure the flexible fingers 50 of an expander 52. As shown, the expander 52 includes a flanged tubular body 54 slidably encircling the reduced diameter portion 24 of stud 14 and at least two flexible fingers 50 extending axially from the body 54 and with the free ends of these fingers normally extending radially outward therefrom, three such fingers being illustrated in the embodiment of the fastener shown in FIGS. 1 through 4, inclusive, these three fingers being best seen in FIG. 3 in their extended position to engage the panel 22. The expander 52 is made of suitable spring material of sufficient flexing quality to permit the fingers 50 to be trapped by the ring 42, as seen in FIG. 1, yet when released by this ring will expand radially outward enough beyond the aperture 20 to engage the back side of the panel 22, the right side of the panel as seen in FIG. 2.

A coiled compression spring 56 is positioned to encircle the reduced diameter portion 24 of stud 14 with one end of the spring abutting against the radial flange 26 and the other end of the spring abutting against the flanged tubular body 54 of the expander 52 to normally bias this expander toward the enlarged head 12 of the fastener.

Thus, in the as assembled condition of the fastener, with the flanged retainer ring 42 encircling the fingers 50 of the expander 52, these fingers having previously been forced radially inward to be received inside the hub portion of the ring 42, the spring 56 will bias the expander 52 in a direction, to the left with reference to FIG. 1, whereby the free ends of these fingers will abut against the shoulder 32 of the stud 14.

Figure 5:
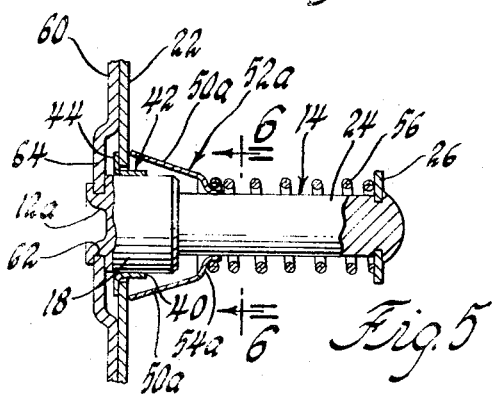
FIG. 5 is a view, similar to that of FIG. 2, illustrating another embodiment of a push-in fastener with the body portion of the fastener formed as a separate element fixed to the part to be fastened to a support panel.
Figure 4:
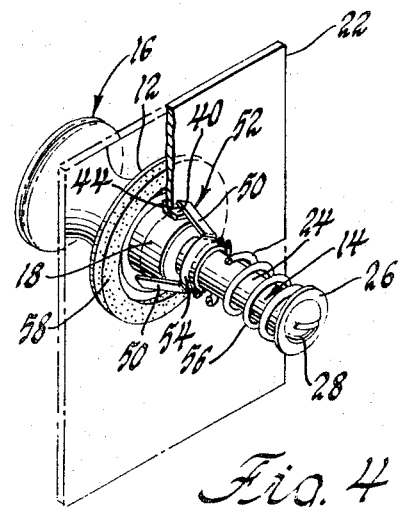
FIG. 4 is a perspective view showing the fastener of FIGS. 1 and 2 assembled to the support panel, the view being from the back side of the panel.

Upon insertion of the stud portion of the fastener through the aperture 20 in the support panel 22, the spring 56 and expander 52 encircling the reduced diameter portion of the stud will freely extend through the aperture 20 but as the ring 42 enters the aperture, its passage therethrough is prevented by engagement of the radial flange 44 thereon with the front side, the left-hand side as seen in FIG. 1, of the panel. Further axial movement of the fastener through the aperture in the panel 22, to the right with reference to FIGS. 1 and 2, will cause the flanged retainer ring 42 to become disengaged from the fingers 50 of the expander 52 whereupon these fingers will immediately spring out radially to their normal extended position, as seen in FIG. 2, to engage the back side of the panel 22 into which the fastener is being inserted and, at the same time, the spring 56 will exert a retention force forcing the retainer to move axially along the reduced diameter portion 24 of the stud to force the free ends of the fingers 50 into holding engagement against the back side of the panel with the enlarged head 12 of the fastener body engaging the opposite side of the panel or against a sound dampening washer 58 sandwiched therebetween. This retention force can be varied, as desired, by suitable sizing of the spring 56. In the embodiment of the fastener illustrated in FIGS. 5 and 6, wherein like elements are identified by reference numerals used to identify these elements in FIGS. 1 through 4, inclusive, the fastener is made as a separate assembly suitably secured to a part to be fastened to the apertured support panel 22, such as a panel 60. In this embodiment, the body of the fastener includes the stepped stud 14 portion containing a first stud body portion 18 and the second portion 24 of reduced diameter and a shank head portion 12a of reduced diameter adapted to be inserted into an aperture 62 in the upset boss 64 of panel 60 after which the free end of the shank head portion 12a is spun over, for example, to clinch and rigidly secure the panel 60 thereto, whereby this panel 60 and the shank head portion 12a in effect form the enlarged head of the fastener which abuts against one side of the panel 22. In a similar manner, the radial flange 26 is clinched to the free end of the portion 24 of stud 14 portion of this fastener.

Figure 6:
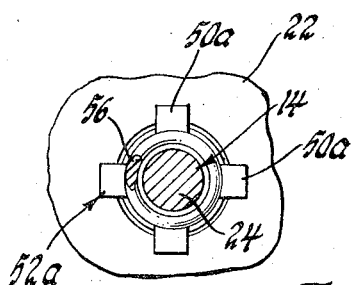
FIG. 6 is a sectional view taken along line 6—6 of FIG. 5.

The expander 52a, as used in this embodiment, has a flanged tubular body portion 54a having four flexible fingers 50a extending therefrom, as best seen in FIG. 6, corresponding to the fingers 50 of expander 52 previously described.

In a further embodiment of the fastener of the invention, as illustrated in FIG. 7, the fastener is made as a separate assembly for use, for example, in attaching and aligning a second panel 60a having a suitable aperture 66 therein to the support panel 22. In this embodiment, the fastener body, per se, has an enlarged head 12a portion formed integral with the stud 14 portion and of a size substantially larger than the diameter of the apertures 20 and 66 in panels 22 and 60a, respectively, whereby the axial extending flange portion 12b of this fastener will for example abut against the outer face of the panel 60a as it is secured by this fastener to panel 22. As shown, the aperture 66 in panel 60a should be of a diameter corresponding to the diameter of aperture 20 in panel 22 so that as this fastener assembly is installed through the apertures in the abutting panels 60a and 22, the flange 44 of the retainer ring 42 will engage the front face of panel 60a to effect its disengagement from the spring 56 biased expander 54a to allow the fingers 50a thereof to assume their outward extending position to clamp the panels 22 and 60a between the free ends of these flexible fingers and the head 12a portion of this fastener assembly.

From the above description of the various embodiments of the fastener assembly illustrated, it will become apparent that this type fastener will provide constant pressure holding a component, such as a panel, to a support panel and that assembly of such components, using this fastener requires no tools or additional parts, and, simply a bump or push of the fastener through the aperture in the support panel to activate this fastener. It also provides for considerable axial clamping takeup which permits its use to assembly components of varying thickness.

What is claimed is:

1. A push-in fastener adapted for insertion through an aperture in a support panel to secure a component thereto, said fastener including a fastener body having a head portion and a stud extending therefrom, said stud having a first portion adjacent to said head portion of a diameter to be slidably received in the aperture of the support panel and a second portion of a reduced diameter with a radial extending flange at its free end, an expander having a flanged tubular body portion slidably encircling said second portion of said stud and having flexible fingers extending axially therefrom toward said first portion and normally extending radially outward therefrom, a coil spring encircling said second portion with one end of said spring abutting against said radial extending flange and its other end abutting against said flanged tubular body portion of said expander and, a flanged retainer ring having a hub portion slidable axially on said first portion of said stud and positioned to releasably encircle and retain said flexible fingers in a radial inward position and a flange portion adapted to be in interference with the surface of the support panel as said stud of said fasteners is inserted into the aperture in the support panel.

2. A push-in fastener according to claim 1 wherein said head portion of said fastener is an integral part of the component being secured to the support panel.

3. A push-in fastener according to claim 1 wherein said head portion is of a diameter substantially greater than the diameter of said first portion of said stud.

4. A push-in fastener adapted for passage into aligned apertures in a panel and a support panel comprising a fastener body having an enlarged head portion and a stud extending therefrom, said stud having a first diameter portion and a reduced diameter portion with an intervening shoulder therebetween, said first diameter portion being adjacent said head portion and of a size to be slidably received in the apertures in the panel and support panel, said reduced diameter portion having a radial extending flange at its free end, an expander having a tubular body portion loosely encircling said reduced diameter portion and movable axially thereon and a plurality of flexible fingers extending axially from said tubular body portion toward said head portion and radially outward thereof, a coiled compression spring encircling said reduced diameter portion engaging said radial extending flange and said tubular body portion of said expander to bias said expander toward said head portion and, a retainer ring slidably encircling said first diameter portion and having a hub portion positioned to encircle and releasably retain said flexible fingers in a radial inward position with the free ends of said fingers in abutment against said shoulder and a radial extending portion of a diameter to be in interference relationship to the panel as said stud is inserted through the apertures in the panel and support panel.

5. A push-in fastener adapted to be inserted into an aperture in a support panel, said fastener including enlarged head means with a stud extending therefrom, said stud having a first portion of a diameter to permit its entry into the aperture in the support panel and a second portion of reduced diameter with a radial flange at its free end, an expander with flexible fingers normally flexed radially outward loosely encircles said second portion with said fingers directed toward said head means, a compression spring being positioned between said radial flange and said expander to bias said expander toward said head means and, a flanged ring encircling the first portion of said stud and said fingers of said expander to releasably retain said fingers radially inward, said flanged ring having a hub portion of a diameter to be slidably received in the aperture of the support panel and a flange portion adapted to engage a face surface of the support panel.

* * * * *